United States Patent
Tamhane et al.

(10) Patent No.: US 10,771,498 B1
(45) Date of Patent: Sep. 8, 2020

(54) VALIDATING DE-AUTHENTICATION REQUESTS

(71) Applicant: MARVELL INTERNATIONAL LTD., Hamilton (BM)

(72) Inventors: Sagar A. Tamhane, Santa Clara, CA (US); Nayan D. Gaywala, Los Altos, CA (US); Liwen Chu, San Ramon, CA (US); Hongyuan Zhang, Fremont, CA (US); Hui-Ling Lou, Sunnyvale, CA (US)

(73) Assignee: Marvell Asia Pte., Ltd., Singapore (SG)

( * ) Notice: Subject to any disclaimer, the term of this patent is extended or adjusted under 35 U.S.C. 154(b) by 763 days.

(21) Appl. No.: 15/178,979

(22) Filed: Jun. 10, 2016

Related U.S. Application Data

(60) Provisional application No. 62/173,599, filed on Jun. 10, 2015.

(51) Int. Cl.
*H04L 29/06* (2006.01)
*H04W 12/12* (2009.01)
*H04W 12/06* (2009.01)

(52) U.S. Cl.
CPC ...... *H04L 63/1458* (2013.01); *H04L 63/1466* (2013.01); *H04W 12/06* (2013.01); *H04W 12/12* (2013.01); *H04L 2463/141* (2013.01)

(58) Field of Classification Search
CPC ............. H04L 63/1458; H04L 63/1466; H04L 2463/141; H04W 12/06; H04W 12/12
See application file for complete search history.

(56) References Cited

U.S. PATENT DOCUMENTS

| | | | |
|---|---|---|---|
| 7,856,209 B1* | 12/2010 | Rawat | G01S 5/02 370/338 |
| 2002/0120865 A1* | 8/2002 | Schwab | H04L 69/08 726/11 |
| 2004/0252837 A1* | 12/2004 | Harvey | H04L 63/1416 380/270 |
| 2005/0141498 A1* | 6/2005 | Cam Winget | H04L 63/08 370/389 |
| 2007/0263562 A1* | 11/2007 | Tang | H04L 63/1458 370/328 |
| 2007/0291945 A1* | 12/2007 | Chuang | H04L 63/145 380/270 |
| 2008/0025324 A1* | 1/2008 | Sawada | H04L 41/00 370/400 |
| 2008/0031209 A1* | 2/2008 | Abhishek | H04W 8/005 370/338 |
| 2014/0204224 A1* | 7/2014 | Fujita | H04N 1/00315 348/207.1 |
| 2014/0259102 A1* | 9/2014 | Gunasekara | H04W 12/06 726/2 |

(Continued)

*Primary Examiner* — Oleg Korsak
*Assistant Examiner* — Devin E Almeida

(57) ABSTRACT

Systems, methods, and other embodiments associated with validating de-authentication requests to prevent spoofing are described. According to one embodiment, an apparatus includes a wireless controller configured to receive a de-authentication request and determine whether the de-authentication request is invalid based on the wireless controller's receipt of two or more responses to a timing request sent by the wireless controller. Only one response is expected. The two or more responses include the address of a first station.

20 Claims, 6 Drawing Sheets

(56) References Cited

U.S. PATENT DOCUMENTS

| | | | | |
|---|---|---|---|---|
| 2015/0012971 A1* | 1/2015 | Ram | .................... | H04W 12/08 |
| | | | | 726/3 |
| 2015/0016383 A1* | 1/2015 | Kim | .................... | H04W 16/14 |
| | | | | 370/329 |
| 2015/0257028 A1* | 9/2015 | Chu | ...................... | G01S 13/74 |
| | | | | 370/252 |
| 2016/0219050 A1* | 7/2016 | Zou | .................... | H04L 63/0869 |

* cited by examiner

VALIDATING DE-AUTHENTICATION REQUESTS

CROSS REFERENCE TO RELATED APPLICATIONS

This patent disclosure claims the benefit of U.S. Provisional Application Ser. No. 62/173,599 filed on Jun. 10, 2015, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Wireless networks provide a convenient way for devices to communicate. However, as the popularity of wireless connectivity grows, security issues unique to wireless communications are more likely to be exploited. For example, maintaining security in a wireless computing environment is a difficult task because wireless communications are transmitted through unsecured space. Thus, devices within range of the communications may receive and read the communications. Consequently, malicious users may attempt to interfere with devices that are wirelessly communicating by seeking to compromise the integrity, authenticity, and/or confidentiality of the wireless communications.

For example, a malicious wireless device may read wireless communications being transmitted between two other devices to obtain information about the devices, such as a media access control (MAC) address. Subsequently, the malicious wireless device can transmit de-authentication requests or other requests using the MAC address of the other device to cause disruptions in the communications, such as a denial of service (DoS) attack. For example, if a client device is attacked, the intent of the malicious device is to disconnect and/or keep the client device from connecting to a specific access point (AP) thereby preventing connection to a network. If the access point is attacked, the intent of the malicious device is to disconnect and/or keep other devices from connecting to the access point.

SUMMARY

In general, in one aspect this specification discloses an apparatus. The device includes a wireless controller configured to receive a de-authentication request and determine whether the de-authentication request is invalid based on the wireless controller's receipt of two or more responses to a timing request sent by the wireless controller. Only one response is expected. The two or more responses include the address of a first station.

In general, in another aspect, this specification discloses a method. The method includes receiving a de-authentication request by a first wireless device. The method includes determining whether the de-authentication request is invalid based on receipt of two or more responses to a timing request sent by the first wireless device. Only one response is expected. The two or more responses include the address of the second wireless controller.

In general, in another aspect, this specification discloses an apparatus. The apparatus includes a wireless controller module stored on a non-transitory computer-readable medium and including instructions that when executed cause the apparatus to receive a de-authentication request and determine whether the de-authentication request is invalid based on the wireless controller's receipt of two or more responses to a timing request sent by the wireless controller. Only one response is expected. The two or more responses include the address of a first station.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Figure 1:
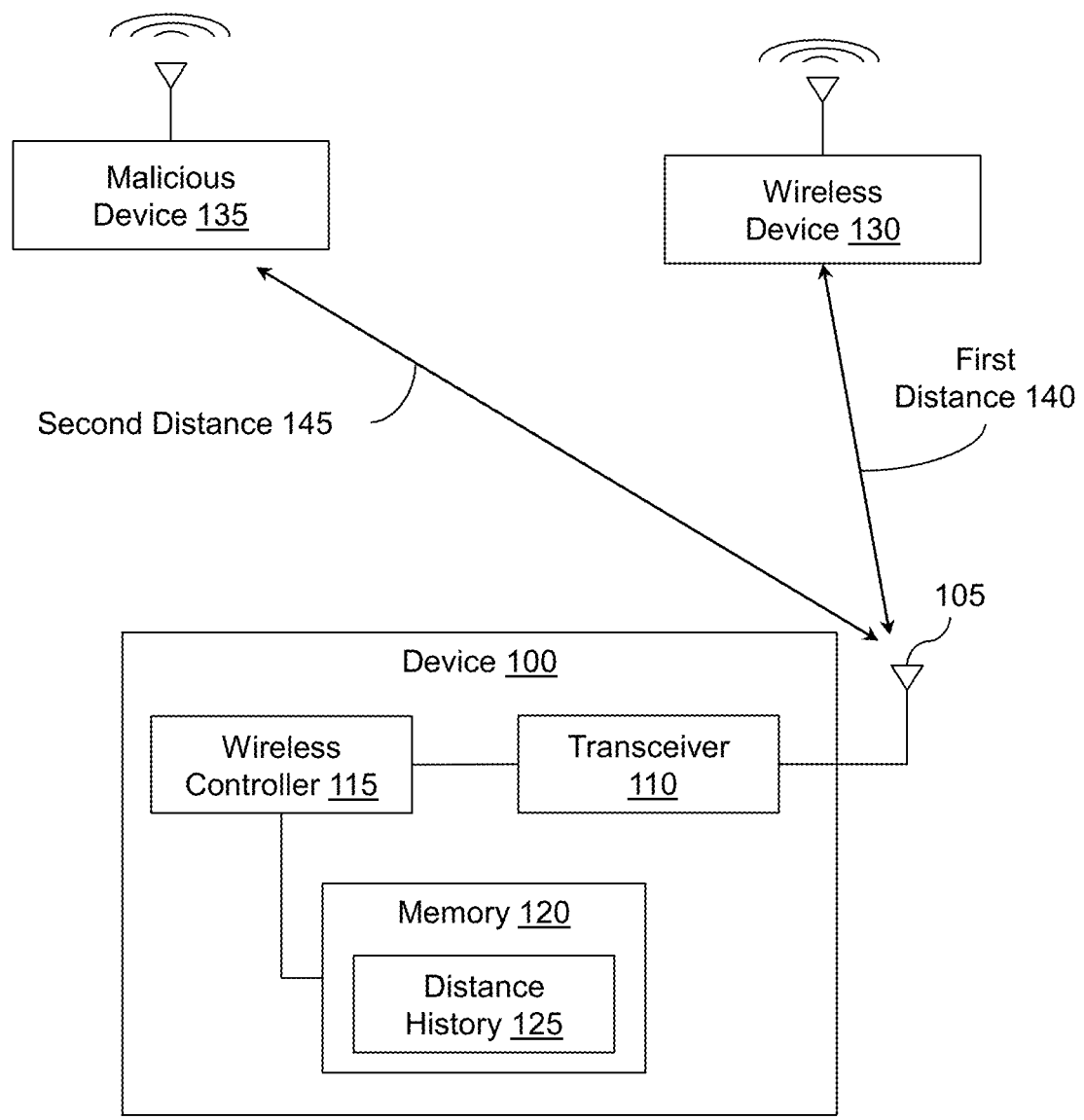
FIG. 1 illustrates one embodiment of a wireless device associated with validating de-authentication requests.

Described herein are examples of systems, methods, and other embodiments associated with validating de-authentication requests to prevent a third party from spoofing the de-authentication requests. A de-authentication request is a request that terminates a communication session between two wireless devices. Thus, a wireless device transmits a de-authentication request to end a communications session with another wireless device. In general, the wireless device may be a wireless station communicating in a wireless local area network (WLAN) with an access point (AP) to obtain access to a wider network, such as the Internet. Thus, the wireless device provides the de-authentication request to the access point to end the communications session. Alternatively, in one embodiment, the access point transmits the de-authentication request to the wireless device to remove the wireless device from the network when, for example, the wireless device has been inactive beyond a defined threshold of time.

In either case, a de-authentication request terminates communications between the two devices. If the devices desire to re-establish communications, then the devices need to re-authenticate with each other. By using de-authentication requests, connections between the devices do not remain open when communications have ceased, for example, due to the wireless device leaving an area of the access point. However, de-authentication requests are not always legitimate. For example, during a de-authentication attack, a malicious device (the attacker) tricks the access point by imitating the wireless device. That is, the malicious device generates and transmits wireless communications that use the address of the wireless device instead of its own address (e.g., the malicious device substitutes its real address in network frames with the address of the valid wireless device). Spoofing the address in this manner causes communications provided by the malicious device to appear as though the communications are coming from the wireless device.

Thus, when a malicious device transmits a de-authentication request while spoofing the wireless device, the wireless device is disconnected from the access point causing interruptions in communications and other difficulties (e.g., denial of service, loss of network connection causing loss of productivity, loss of revenue, etc.). This type of attack is accomplished because the access point cannot differentiate between communications from the actual wireless device and the malicious device when the malicious device spoofs the address of the wireless device. Thus, a spoofed de-authentication request will terminate a communications session between the wireless device and the access point even though the wireless device did not request to terminate the session. Therefore, in one embodiment, a device is disclosed herein having a mechanism that, in response to receiving a de-authentication request, first validates the de-authentication request before ending a communications session.

For example, in one embodiment, when a wireless device receives a de-authentication request from a requesting device, instead of immediately ending the communications session, the wireless device transmits a query back to the requesting device to confirm whether the de-authentication request was actually transmitted by the requesting device (e.g., a valid request from the requesting device). Depending on a response (or multiple responses) received to the query, the wireless device can identify whether the de-authentication request is potentially invalid and can take further actions to confirm the de-authentication. Using the disclosed validation techniques, a wireless device can avoid losing communication connections caused by malicious devices spoofing de-authentication requests.

FIG. 1 illustrates an embodiment of a wireless communication device 100. The device 100 may be configured to validate de-authentication requests, detect a de-authentication attack and avoid being spoofed by fake de-authentication requests. The device 100 may be implemented as a network communication device that transmits and receives signals using an antenna 105 in combination with a transceiver 110 or a separate transmitter and receiver. The transceiver 110 may be configured to communicate wirelessly. In one embodiment, the transceiver 110 is connected to the antenna 105 for transmitting and receiving wireless signals. The device 100 also includes, for example, a wireless controller 115 and a memory 120. The wireless controller 115 is, for example, a combination of logic circuitry and firmware that are configured to perform methods disclosed herein.

Additionally, in one embodiment, the wireless controller 115 is implemented as a system on a chip (SoC) or a processor that is programmed with one or modules including instructions that when executed by the processor cause the processor to perform the disclosed functions. In further embodiments, the device 100 may include a separate processor (e.g., application specific processor, central processing unit, etc.) in addition to other hardware and logic elements that are not illustrated. In one embodiment, the device 100 is implemented on a chip including one or more integrated circuits configured to perform one or more of the functions described herein.

In general, the device 100 wirelessly communicates with wireless device 130 in a network or using another previously authenticated and established communication session. That is, in one embodiment, the device 100 acts as an access point that provides a network (e.g., basic service set (BSS)) with access to a wide area network (WAN), the Internet, or another network resource. In an alternative embodiment, the wireless device 130 acts as an access point, and the device 100 is a station in communication with the wireless device 130 acting as an AP. In either case, the disclosed functions may be implemented and executed from either device to prevent spoofing of de-authentication requests. Accordingly, whichever device originally receives a de-authentication requests initiates a validation process by sending a query to confirm the de-authentication.

However, prior to receiving a de-authentication request, the device 100 and the wireless device 130 are, for example, communicating and the wireless controller 115 periodically performs a distance measurement of a distance 140 between the devices. The distance measurements may be used for many different purposes, such as location services (wireless location services (WLS)), power adjustments, and in one embodiment is appropriated by the wireless controller 115 in validating de-authentication requests, as will be discussed subsequently. In either case, the device 100 periodically initiates the measurements to provide at least one of the noted services. Accordingly, the device 100 may retain a distance history 125 of the distance measurements stored in the memory 120.

Figure 2:
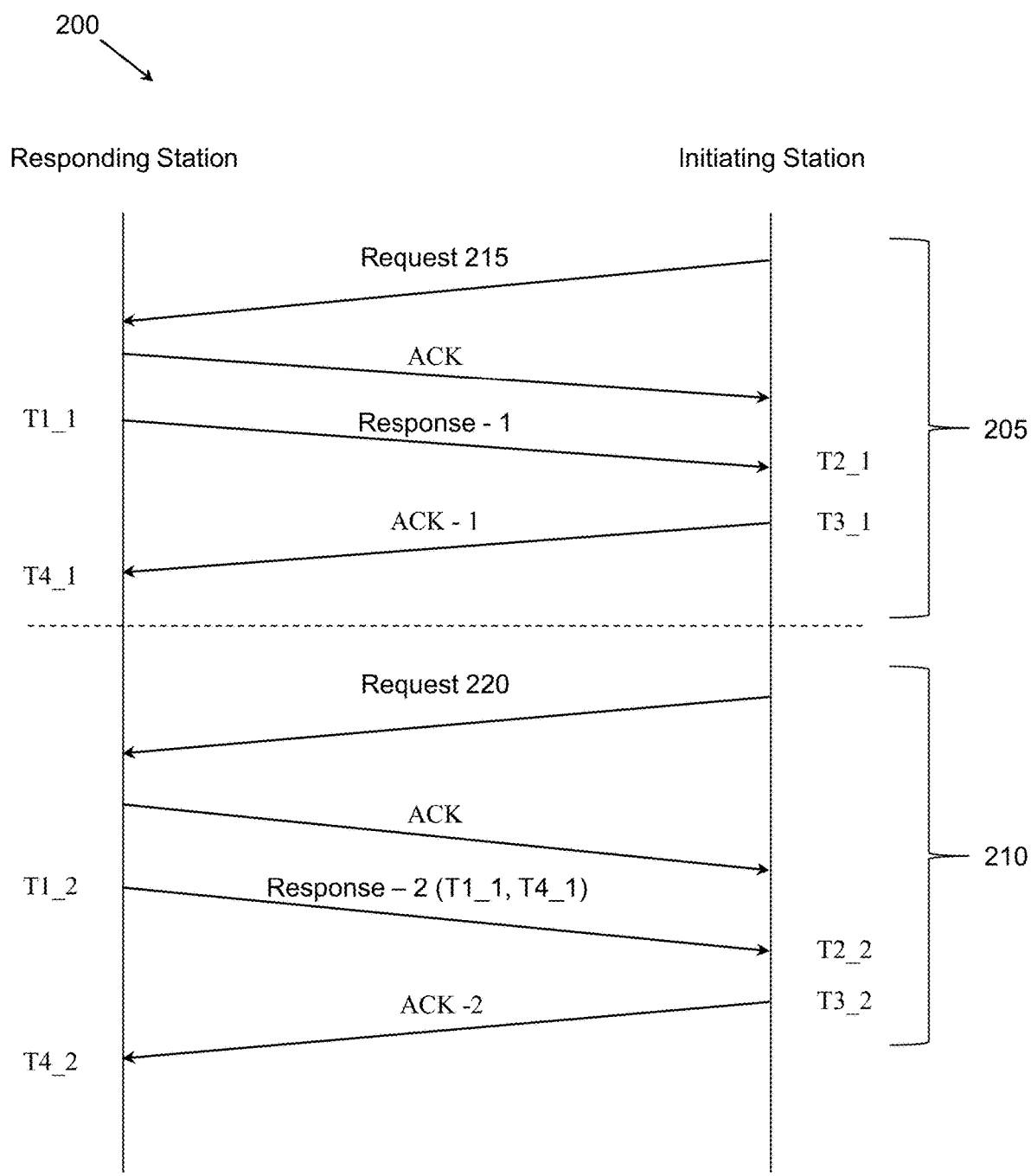
FIG. 2 illustrates one embodiment of communications exchanged to perform timing measurements.

With reference to FIG. 2, a flow chart 200 illustrates an example of communications that are exchanged between two wireless devices (e.g., device 100 and device 130) relating to a timing measurement used to generate the distance measurement (also referred to herein as ranging). For example, flow chart 200 illustrates communications that are part of the timing measurement. In one embodiment, the timing measurement is a fine time measurement (FTM). The fine time measurement (FTM) is a protocol relating to measurements of the time for a round-trip communication of a data frame between two devices. The round-trip time that results from an FTM exchange is a length of time for a signal to propagate between two devices and to be acknowledged by the respective devices. A distance 140 between the two devices can then be derived based on the round-trip time of the FTM exchange.

As shown in FIG. 2, there are two bursts of communications 205 and 210. The bursts 205 and 210 are shown for illustrative purposes. However, additional bursts may occur as part of the FTM exchange 200. As used herein, a burst refers to a series of communications exchanged between two devices to perform the timing measurements. The burst 205 and the burst 210 represent two separate exchanges between the device 100 and the wireless device 130 that separately measure a round-trip time. Additionally, as depicted, an initiating station is a station that initially provides a request 215. As implemented with the wireless controller 115, a device that initiates the exchange 200 may switch from one measurement to another. That is, the device 100 may initiate a first FTM exchange, then the wireless device 130 may initiate a subsequent FTM exchange, and so on. In this way, each of the devices may separately obtain a distance and maintain a distance history 125.

Furthermore, the wireless controller 115, in one embodiment, initiates the FTM exchange 200 at a regular interval or period that is defined according to, for example, a particular implementation. That is, to update the value of the distance 140, the wireless controller 115 initiates the FTM exchange 200 every x seconds (e.g., 2 seconds). In general, the interval between FTM exchanges depends on, for example, a desired accuracy, environmental conditions (e.g., rate of movement), and so on. In either case, the FTM exchange 200 occurs between the devices at a regular interval to maintain the distance history 125.

With reference to the particular communications of the bursts 205 and 210, as previously indicated the request 215 initiates the exchange between the two wireless devices. After an initiation by the wireless controller 115, the request 215 is transmitted from the device 100 to the wireless device 130. While the request 215, is intended only for the wireless device 130, it may also be received by other devices within a transmission range of the device 100. Thus, a malicious device 135 may also receive the request 215.

After receiving the request 215, the responding station (e.g., the wireless device 130) responds to the request 215 with an acknowledgment and a first measurement frame "response-1." The first measurement frame "response-1" can be performed shortly after the acknowledgment. As shown in FIG. 2, timing measurements of the first burst 205 are indicated as T1_1, T2_1, T3_1, and T4_1. The responding station records T1_1 and T4_1 while the initiating station records T2_1 and T3_1. These timing measurements correspond with transmission and/or reception of the respective management frames "response-1" and "ACK-1."

However, the round-trip time cannot be calculated by the wireless controller 115 (i.e., initiating station) until, for example, the time measurements T1_1 and T4_1 are provided back to the wireless controller 115. Thus, in one embodiment, the second burst 210 provides the time measurements T1_1 and T4_1 back to the device 100 as part of a time measurement frame "Response-2). Similarly, each subsequent burst x provides measurements T1_(x-1) and T4_(x-1) from a previous burst (x-1). As previously noted, each burst is a series of communications between the devices 100 and 130 that are used to measure the round-trip time. While the burst 210 is illustrated as including the request 220 and the corresponding "ACK," in one embodiment, the request 220 and the subsequent ACK may be omitted from subsequent bursts. Upon receiving the Response-2 that includes the T1_1 and T1_4 time measurements, the wireless controller 115 computes the round-trip time between the device 100 and the wireless device 130.

With respect to FIG. 1, the malicious device 135 may attempt to interfere with the communications session between the device 100 and the wireless device 130 during normal communications in an established wireless local area network (WLAN) and during periodic timing measurements for determining the distance 140. In one embodiment, the malicious device 135 can transmit a de-authentication request to the device 100 by spoofing an address of the wireless device 130 in the request. That is, the device 135 replaces a media access control (MAC) address that identifies a source of the de-authentication request as the device 135 with an address of the wireless device 130 to provide the communication with the appearance of being transmitted from the wireless device 130.

Because the device 100 may not be aware of the presence of the malicious device 135, but is aware that a de-authentication request can be spoofed to interfere with communications, the wireless controller 115 is configured, in one embodiment, to validate the de-authentication request. Accordingly, upon receiving the de-authentication request, the wireless controller 115 transmits a timing measurement request. The timing request is, for example, similar to the request 215 as discussed along with FIG. 2.

The wireless controller 115 uses the timing request to query the device 130 about whether the de-authentication request is valid. In one embodiment, the wireless controller 115 modifies a timing request frame of a fine timing measurement (FTM) protocol by adding a bit to the end of the timing request frame to query the device 130. Alternatively, the wireless controller 115 may use a reserved bit of the timing request frame to indicate the query. With either implementation, asserting a bit in the frame that correlates with querying about the validity of a de-authentication request, the wireless controller 115 indicates to the device 130 that a response is requested about whether the device 130 sent the de-authentication request.

Figure 3:
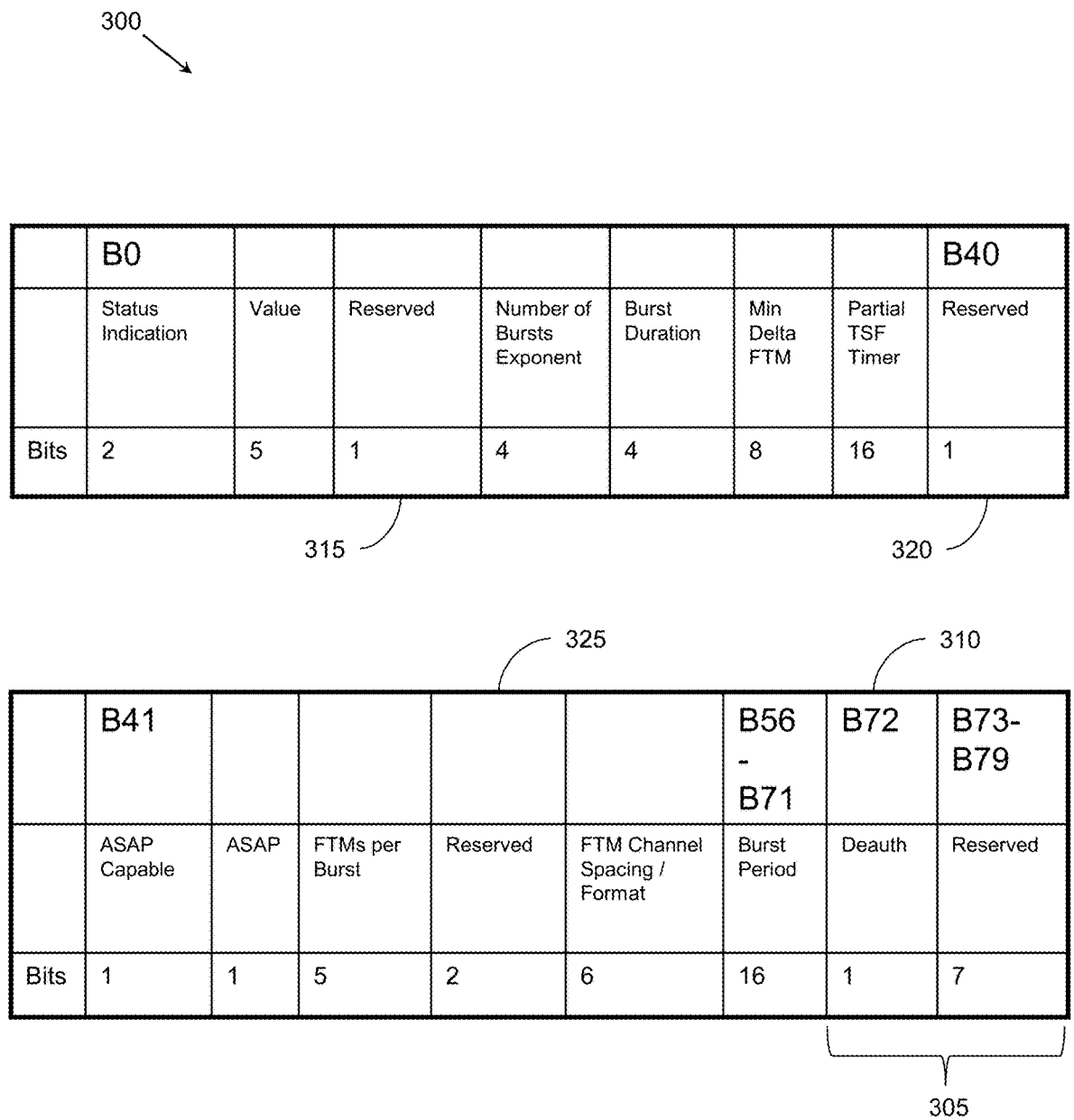
FIG. 3 illustrates one example of a fine time measurement (FTM) request frame.

With reference to FIG. 3, a general format of an FTM request frame 300 with bits B0 to B79 is illustrated. The FTM request frame 300 represents a modified frame that has been altered by the wireless controller 115 to add an octet 305 (i.e., a section of 8 bits) to the frame 300. A first bit (B72) 310 of the additional octet 305 is labeled "deauth" and may be the bit that indicates whether the frame includes a query for validation a de-authentication request. Alternatively, the wireless controller 115 may be configured to repurpose one or more of reserved bits 315, 320 or 325 to indicate this query, instead of the additional octet 305. The wireless controller 115 may use a single bit in the request frame 300 to query a device about a de-authentication request.

With respect to FIG. 1, after the wireless controller 115 transmits the timing request to the wireless device 130, the wireless controller 115 generally expects a single response if the original de-authentication request is valid. However, to account for the de-authentication possibly being spoofed, the wireless controller 115, in one embodiment, is configured to wait for an amount of time to allow for receipt of multiple responses. That is, both the wireless device 130 and the malicious device 135 may provide responses with a source address as that of the wireless device 130.

The wireless controller may determine whether the respective device provided the original de-authentication request based on the response from each device. Thus, using the same bit indicated in relation to the frame 300 of FIG. 3, a responding device can indicate that the device did provide the de-authentication request (e.g., by assigning a value of "1" high bit to indicate a positive response) or did not (e.g., by assigning a value of "0" low bit to indicate a negative response). When the wireless device 130 does not provide the de-authentication request, a response from the wireless device 130 asserts a negative response. However, a response from the malicious device 135 indicates a positive response confirming the de-authentication request. Because the wireless device 100 does not know which response the device 130 provided since both responses identify the device 130 as the source, the wireless controller 115 cannot yet make a final determination of validity about the de-authentication request.

Upon receiving two responses to the query, the wireless controller 115 confirms and/or detects the presence of an unknown device (i.e., the malicious device 135) because only a single response should be received. Conflicting responses are a further indication that the de-authentication request may be invalid. For example, the wireless controller 115 receives a positive confirmation response from the malicious device 135 indicating the de-authentication request is valid. The wireless controller 115 also receives a denial response from the wireless device 130 indicating the de-authentication request is not valid. At this point, the wireless controller 115 cannot distinguish which device provided the respective responses to the query. This is because the malicious device 135 spoofs an address of the wireless device 130 in the confirmed response and no additional distinguishing characteristics are available to determine an origin of the responses.

The wireless controller 115 proceeds with the timing measurement as originally requested along with the query. However, because two responses are received in reply to the original timing request, the wireless controller 115 obtains two sets of measurements from the timing measurement. Thus, using the timing measurements, the wireless controller 115 derives two separate distances 140 and 145 corresponding to the two devices 130 and 135, respectively. The distance 145 is associated with the confirmed response from the malicious device 135, and the distance 140 is associated with the denial response from the wireless device 130. In one embodiment, the wireless controller 115 can separately identify/track the communications from the devices 130 and 135 using, for example, frame identifiers, signal strength indicators or some other unique identifying characteristic of frames from the separate devices even though the communications all identify the same source address. As such, the wireless controller 115 still, for example, may not be able to identify which communication is legitimate but may at least separately distinguish between the communications from both of the devices 130 and 135.

The wireless controller 115 compares the distances 140 and 145 with a previous distance of the wireless device 130 stored in the distance history 125. In this way, the wireless controller 115 can use identifying information about the device 130 to determine which response (i.e., the confirmed response or the denial response) is from the device 130 and which response is from the device 135. Based on this comparison the wireless controller 115 identifies whether the de-authentication request is valid or invalid.

For example, the wireless controller 115 compares the distances 140 and 145 to the previous distance. In one embodiment, the wireless controller 115 determines the de-authentication request is invalid when the distance 145 associated with the confirmed response does not match the previous distance. Thus, in this example, the wireless controller 115 identifies that the confirmed response is not legitimate and that the de-authentication request is not valid. Alternatively, in one embodiment, based on a determination that a previous distance matches the distance 140 associated with the denial response to within a threshold amount (e.g., less than 1% variance), the wireless controller 115 also confirms that the de-authentication request is invalid. The wireless controller 115 can determine that a request is from the wireless device 130 since the distance 140 associated with the denial response matches the previous distance. Based on the wireless controller's 115 identification that the denial response is legitimate the de-authentication request is invalidated because the denial response indicates that the de-authentication request is not valid. Generally, the wireless controller 115 validates/invalidates one or more query responses based on identifying information of the device 130. Therefore, the wireless controller 115 can further authenticate the de-authentication request before terminating the communications session.

Because the distance 145 is, for example, significantly different from the previous distance, the inference is that the response to the query provided over the distance 145 is spoofed since the actual device 130 is not likely to have moved and the response from distance 140 better correlates with a last known distance of the actual device 130. The wireless controller 115, in one embodiment, will validate a de-authentication request based upon (i) receiving a positive response to the query (i.e., a confirmed response) and (ii) confirming that the distance of the device that sent the positive response correlates with a last known distance of a device with an established connection. Unnecessary termination of network connections can be avoided based on the wireless controller 115 validating a de-authentication request.

If the wireless controller 115 determines that the de-authentication request was spoofed by the device 135, then the wireless controller 115 may issue an alert to a network security appliance, may track the device 135 using the FTM requests, may ignore any communications from the device 135 or may perform other additional actions to mitigate a threat from the device 135.

Figure 4:
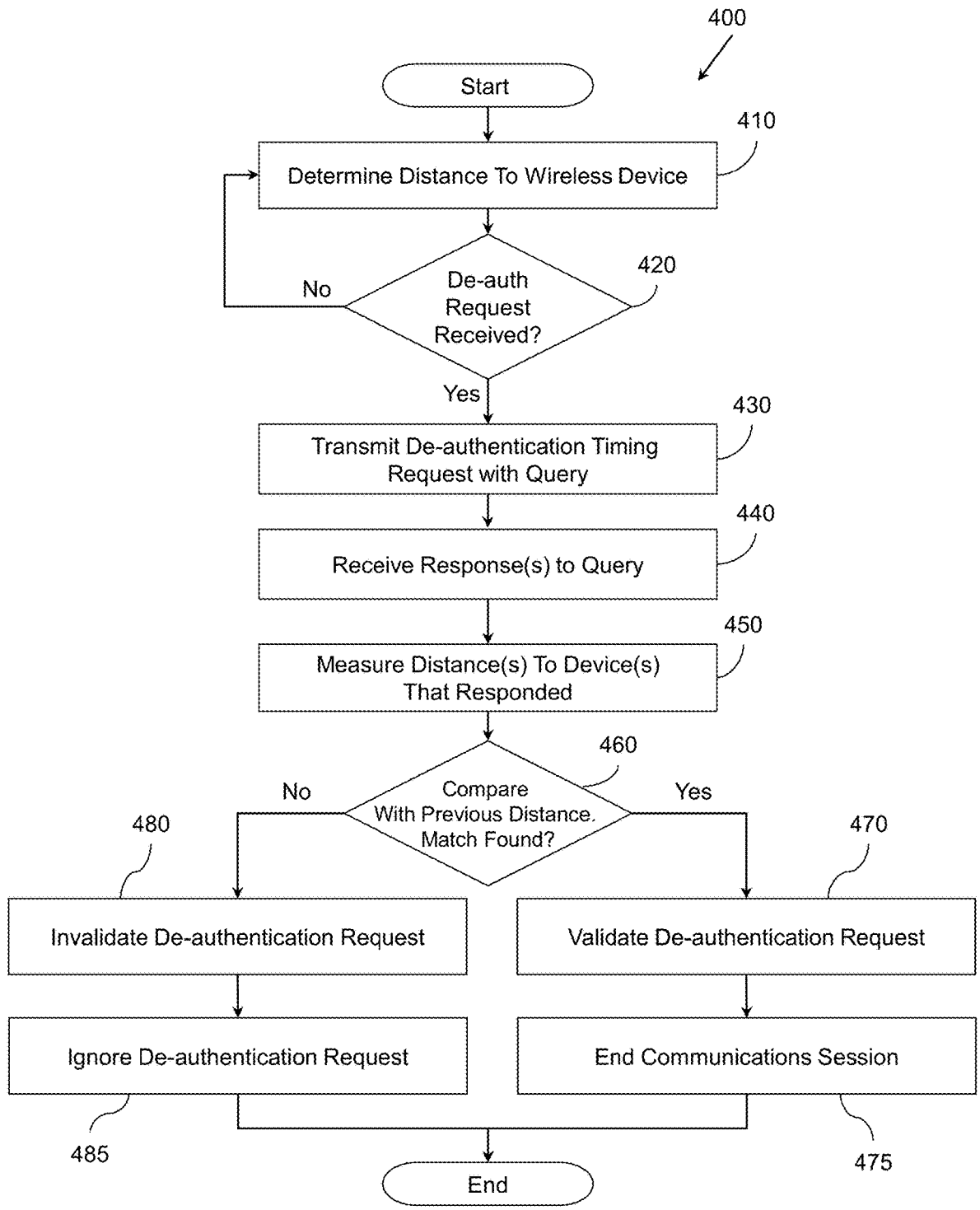
FIG. 4 illustrates one embodiment of a method associated with detecting when a third party is spoofing a de-authentication request.
Figure 5:
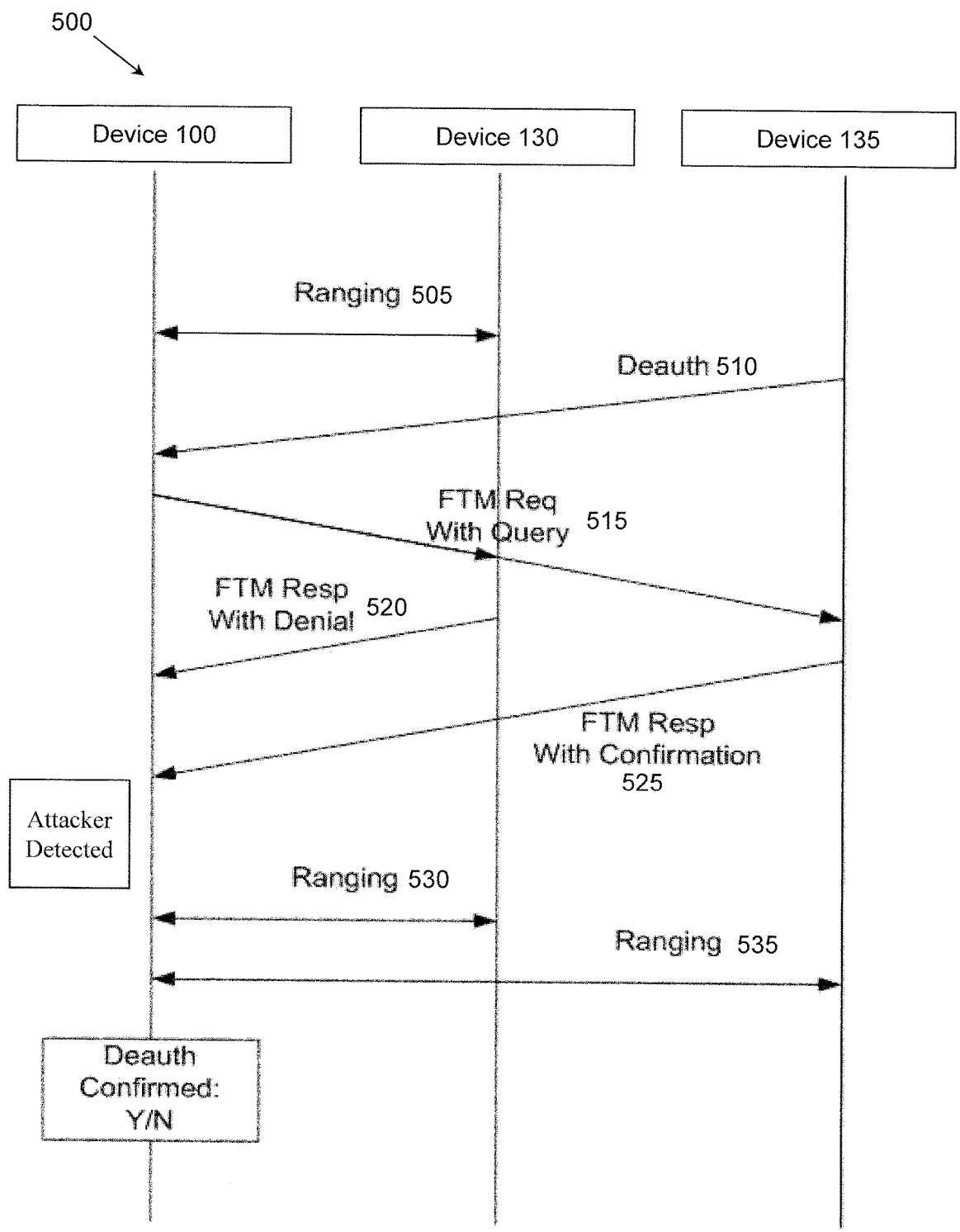
FIG. 5 illustrates one example of an exchange of wireless communications between two devices when attempting to validate a de-authentication request.

Further aspects of validating de-authentication requests will be discussed in relation to FIG. 4. FIG. 4 illustrates one embodiment of a method 400 associated with validating de-authentication requests to avoid spoofing attacks. In one example, method 400 may be performed by the device 100 of FIG. 1 and/or are embodied by the communications 500 illustrated in FIG. 5. In one example, method 400 is based on a communication connection established between the device 100 and the device 130. While method 400 is discussed as being performed by the device 100, the method 400 may also be implemented by the device 130 or by any other device.

At 410, a distance 140 is determined, the distance 140 being between the device 100 and the wireless devices 130. In one embodiment, determining the distance is based on the wireless controller 115 initiation of a timing measurement, exchange of communications with the device 130 while recording times associated with the communications, and derivation of a round-trip time for the exchanged communications based on the recorded times. The distance 140 is determined based on the round-trip time for the exchanged communications.

In one example, at 410, the devices 100 and 130 perform ranging 505 (shown in FIG. 5) to determine the distance 140 from the device 100 to the device 130 (which may move and thus change the distance 140 at different times). The distance 140 may be stored in a distance history 125, e.g., at various points in time. In one example, the ranging 505 is performed by the devices 100 and 130. The ranging 505 discussed in relation to FIG. 5 refers to performing timing measurements as discussed along with FIG. 2 that are then used to derive the distance 140 (e.g., a range/distance from device 100). Generally, the distance determinations at 410 occur during a communications session between the devices 100 and 130 and before a de-authentication request is received in the device 100. In one example, the ranging 505 may be initiated and/or performed for purposes not related to de-authentication, such as indoor location services (e.g., wireless location services (WLS)) or power management services.

At 420, the device 100 receives a de-authentication request. In one embodiment, receiving the de-authentication request includes decoding, buffering and/or storing the request in a memory (e.g., memory 120). In one example, the de-authentication request 510 (FIG. 5) is a request provided to a wireless device that is participating in a wireless communications session (e.g., wireless network) with another device. The de-authentication request 510 indicates that the communications session should be terminated. In some examples, the de-authentication request 510 is provided in order to remove an inactive device from a network and/or end a session when leaving a network. However, when the de-authentication request 510 is spoofed (e.g., by device 135) by malicious modification of the request to include a source address of another device (e.g., device 130), a connection may be interrupted or otherwise terminated because of this denial of service (DoS) attack.

At 430, the device 100 provides a query in response to the de-authentication request. At 430, the device 100 may generate and/or transmit the query. In one embodiment, at 430 a time measurement request frame is modified to include an additional bit. The bit may indicate the timing request is also a query about the de-authentication request. At 430, the modified frame may be provided as part of a wireless communication. For example, the device 100 modifies a time measurement request frame (e.g., FTM request) by adding an octet or repurposing a reserved bit, as discussed in respect to FIG. 3. The device 100 may thus control the device 130 to provide a response indicating whether or not the device 130 actually provided the de-authentication request.

At 430, the device 100 may transmit the timing request 515. The timing request 515 may include the query directed to identifying the validity of the de-authentication request. Because the device 100 wirelessly transmits the timing request 515, the request 515 may be received by both the device 130 and a spoofing device (e.g., device 135). Thus, both devices 130 and 135 may provide a response. The device 135 may provide spoofed communications thereby complicating the confirmation process of the validity of the de-authentication request 510.

At 440, one or more responses to the timing request are received (e.g., by the device 100). In one embodiment, at 440, receiving the responses may include buffering the responses, decoding the responses, and/or waiting/monitoring for the responses for a threshold amount of time before proceeding with method 400. In the example illustrated in FIG. 5, the device 100 receives both responses 520 and 525. Response 520 denies sending the de-authentication request 510. Response 525 confirms sending the de-authentication request 510.

However, because the denial response 520 and the confirming response 525 have the same source MAC addresses, both responses may appear to have originated from the same device 130. As such, the device 100 cannot yet confirm which of the responses 520 or 525 came from the actual device 130. Yet, the device 100 does detect that an attacker device is present by the receipt of two responses when a single response was expected. Evidence of an attacker device is especially true in an instance where two responses give conflicting answers to the de-authentication query. Therefore, additional validation of the responses 520 and 525 is undertaken before the de-authentication request can be confirmed as valid or invalid.

At 450, distances are determined between the device 100 and the responding devices. In one embodiment, the distances may be determined based on communication exchanges between the device 100 and the responding devices. The times associated with the communications are recorded and a round-trip time is determined based on the recorded times. The distances may be determined based on the respective round-trip times between the originating device (e.g., device 100) and the responding devices (e.g., devices 130 and 135). In one example, the device 100 executes ranging 530 and 535 (i.e., timing measurements for computing the respective distances 140 and 145) in response to the request 515. Because the request 515 is a request to perform timing measurements, similar to request 215 from FIG. 2, the request 515 initiates timing measurements with both of the devices 130 and 135 so that the distances 140 and 145 can be derived (also referred to as ranging herein). The ranging 530 and 535 includes exchanging communications for timing measurements, as discussed in relation to FIG. 2, that are then used to derive the distances 140 and 145, respectively. Because the device 135 is attempting to spoof the de-authentication request, the device 135 participates in the ranging 535 to further attempt to thwart the validation process.

Accordingly, both devices 130 and 135 provide responses for the timing measurements to the device 100. The device 100 then computes separate distances for the separate communications provided for the ranging 530 and 535. Accordingly, the device 100 computes a first distance 140 and a second distance 145 that are respectively associated with the first response 520 (e.g., from the device denying the transmission of the de-auth request 510) and the second response 525 (e.g., from the device confirming the transmission of the de-auth request 510).

At 460, the distances are compared with a previous known distance of the wireless device that has a legitimate communication connection established with the device 100. In one embodiment, comparing the distances may be based on retrieving a previous stored distance of the device 130 from the distance history 125, checking/comparing the first distance 140 against the previous stored distance, checking/comparing the second distance 145 against the previous stored distance, and branching to a separate routine depending on a result of each check/comparison. For example, the device 100 may compare/check a distance with a most recently stored distance for the device 130 from the memory 120. The memory 120 may store a log/history of the previous distances.

Generally, if the de-authentication request 510 is from the actual device 130 and is not being spoofed, the first distance 140 determined at 450 should match (within a threshold) the previously stored distance closely. Generally, the present location of device 130 is expected to be within a reasonably close proximity to its prior location. At 460, the device 100 determines that the response came from the actual device 130 and validates the de-authentication request at 470 based on a determination that the distance 140 matches (within a threshold) the previously stored distance of the known device 130.

In one embodiment, if, at 460, the previous distance does not match a distance (e.g., distance 145) determined for the response that confirms the de-authentication request 510, then the method 400 proceeds to 480. If, at 460, the previous distance does match a distance (e.g., distance 140) determined for the response that confirms the de-authentication request 510, then the method 400 proceeds to 470.

Alternatively, in one embodiment, the device 100 may invalidate the de-authentication request 510 if, at 460, the previous distance matches a distance (e.g., distance 140) associated with the response that denies the de-authentication request 510 was sent. Accordingly, in the alternative embodiment, the device 100 authenticates the denial response to determine whether the de-authentication request is invalid. In other words, the device 100 determines which response is from the legitimate device (i.e., device 130) and authenticates the de-authentication request 510 or not according to that response.

At 470, the de-authentication request is confirmed by the wireless controller 115. In one embodiment, confirming the de-authentication request includes logging the de-authentication request, transmitting a confirmation communication, and so on. As such, the device 100 confirms the de-authentication request 510 when the de-authentication request 510 can be matched to the device 130 according to a previous distance of the device 130. For example, when the device 100 validates that the query confirming the de-auth request came from a device at a distance that correlates with the previous distance (e.g., closely matches within a threshold) from the distance history 125, then the de-authentication request 510 is considered to be valid.

At 475, after validating the de-authentication request at 470, the device 100 ends the communication session. In one embodiment, the device 100 ends the communication session by removing the session from a table of active sessions, revoking access rights (e.g., revoking a cryptographic key), logging the termination and ceasing communicating with the device 130. Thus, the device 100 ends communications with the device 130 at 475.

At 480, the de-authentication request is invalidated by the wireless controller 115. In one embodiment, invalidating the de-authentication request includes logging the de-authentication request, dropping the request from memory, generating and transmitting an alert message/signal, and ignoring the de-authentication at 485 by maintaining the communications session with device 130. For example, when the present distance (e.g., 145) does not correlate with a previously stored distance, the device 100 will not trust a corresponding communication because the respective device 135 is likely providing the de-authentication as a spoofed communication. Because the distance measurements generally occur at a frequent and regular interval, an immediately previous known distance is likely a very close correlation to a current distance of the device 130. Accordingly, when a distance measurement indicates that the device is substantially farther from a recent prior location, then it can be determined that the device is likely not the actual device.

Accordingly, the device 100 ignores the de-authentication request at 485. At 485, the device 100 may also generate and transmit an alert message or other communication to a network security device identifying the presence of a spoofing device in the network. In either case, the communications session is maintained, at 480, and the de-auth request is ignored at 485.

Where both devices 130 and 135 are located an same equal distance from the device 100, the device 100 may erroneously confirm the de-authentication request at 470. However, because the device 100 is, in one embodiment, able to measure the distance to within a very close degree (e.g., <1 cm), this confirmation is unlikely.

Figure 6:
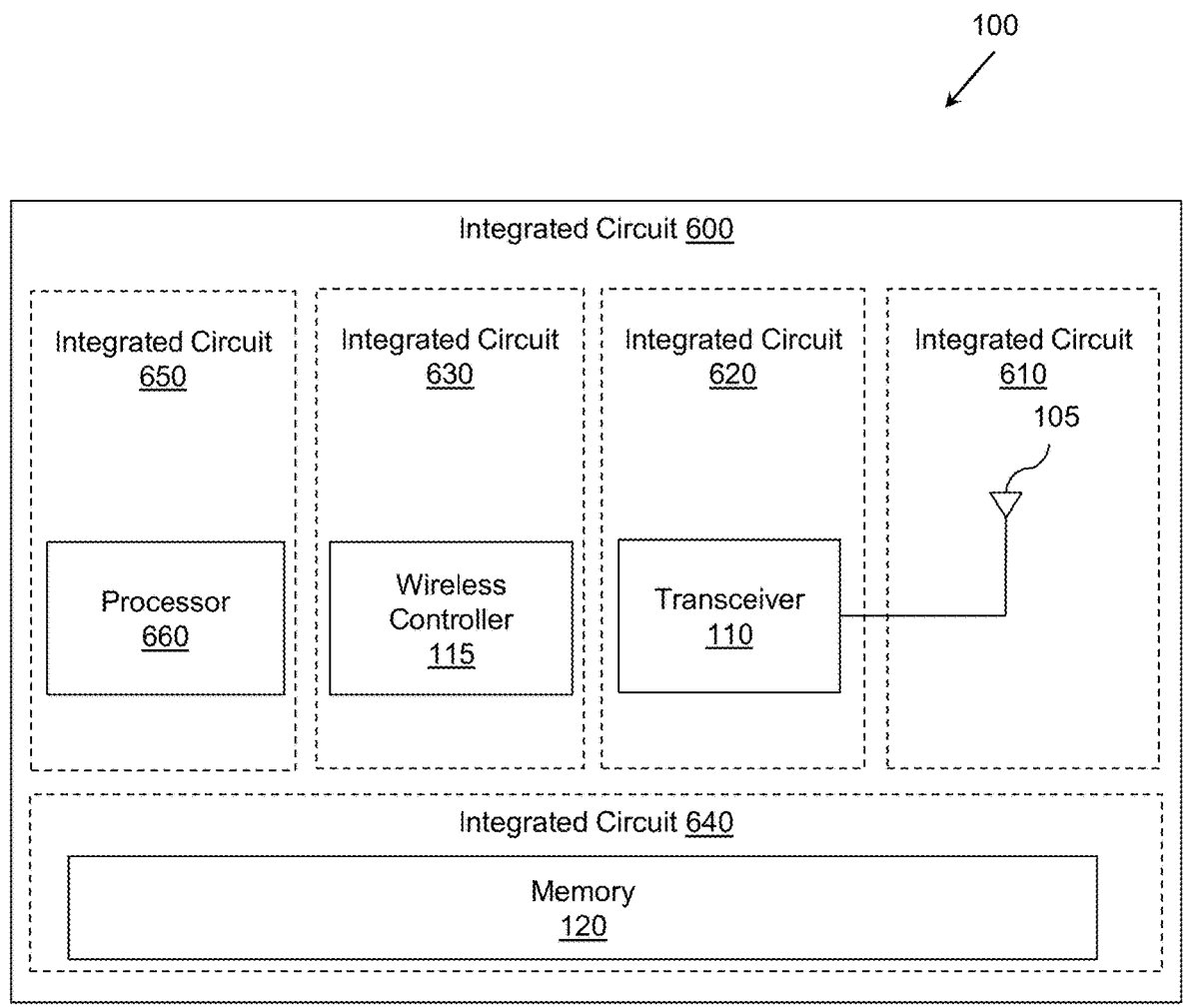
FIG. 6 illustrates one embodiment of an integrated circuit associated with validating de-authentication requests.

FIG. 6 illustrates an additional embodiment of the device 100 from FIG. 1 that is configured with separate integrated circuits and/or chips embodied within, for example, a single circuit board 600. In this embodiment, the antenna 105 is embodied on a separate integrated circuit 610 connected to the transceiver 110 that is embodied on a separate integrated circuit 620. The wireless controller 115 from FIG. 1 is embodied as a separate integrated circuit 630 while the memory 120 is embodied on an integrated circuit 630. Additionally, an integrated circuit 650 includes a processor 660. The circuits are connected via connection paths to communicate signals. While integrated circuits 610, 620, 630, 640 and 650 are illustrated as separate integrated circuits, they may be integrated into the common circuit board 600. Additionally, integrated circuits 610, 620, 630, 640 and 650 may be combined into fewer integrated circuits or divided into more integrated circuits than illustrated. Additionally, in another embodiment, the wireless controller 115, the transceiver 110, and the processor 660 may be combined into a separate application specific integrated circuit.

The following includes definitions of selected terms employed herein. The definitions include various examples and/or forms of components that fall within the scope of a term, and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing one or more modules of instructions that when executed perform an algorithm as described herein, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic, as described herein, is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

What is claimed is:

1. An apparatus for validating a de-authentication request, the apparatus comprising:
   a wireless controller configured to receive the de-authentication request and determine whether the de-authentication request is invalid based on the wireless controller's receipt of two or more responses to a timing request sent by the wireless controller in response to the de-authentication request, wherein only one response is expected, and wherein the two or more responses include an address of a first station, and at least one response of the two or more responses to the timing request includes a confirmation of transmitting the de-authentication request, the confirmation received from one of the first station or a second station, and at least one response of the two or more responses to the timing request includes a denial of transmitting the de-authentication request, the denial received (i) from the first station if the confirmation is received from second station or (ii) from the second station if the confirmation is received from the first station.

2. The apparatus of claim 1,
   further comprising a memory configured to store at least a prior distance between the apparatus and the first station, and
   wherein the wireless controller is further configured to determine that one of the two or more responses which is associated with the de-authentication request is invalid based on a comparison of the prior distance with a distance associated with that one of the two or more responses and the confirmation of transmitting the de-authentication request in the one of the two or more responses.

3. The apparatus of claim 2, wherein the wireless controller determines that the distance does not match the prior distance, wherein, in response to identifying that the de-authentication request is invalid based on the distance not matching the prior distance, the wireless controller is configured to provide an indication to ignore the de-authentication request.

4. The apparatus of claim 1, wherein the wireless controller is configured to:
   determine, prior to receiving the de-authentication request, a distance between the apparatus and the first station using timing measurements exchanged with the first station, and
   store the distance in a memory to maintain a log of previous distances between the apparatus and the first station.

5. The apparatus of claim 1, wherein the wireless controller is configured to indicate the query in the timing request based on at least one of a reserved bit and an additional bit,
   wherein the timing request is a fine time measurement (FTM) initiation request that includes at least one bit that causes the first station to provide the response with the confirmation or denial of transmitting the de-authentication request.

6. The apparatus of claim 1, wherein the apparatus is an access point (AP) station configured to provide a wireless local area network (WLAN), and
   wherein the wireless controller is configured to receive the two or more responses to the timing request by monitoring for the responses for a threshold amount of time.

7. The apparatus of claim 1, wherein the first station is an access point (AP) station and the apparatus is a station configured to communicate in a wireless local area network (WLAN) provided by the access point station, wherein a distance between the first station and the apparatus is based on a time measurement, the time measurement being a fine time measurement (FTM) that is an exchange of communications for a wireless location service (WLS).

8. A method for validating a de-authentication request, the method comprising:
   receiving the de-authentication request by a first wireless device; and
   determining whether the de-authentication request is invalid based on receipt of two or more responses to a timing request sent by the first wireless device in response to the de-authentication request, wherein only one response is expected, and wherein the two or more responses include an address of a second wireless device, and at least one response of the two or more responses to the timing request includes a confirmation of transmitting the de-authentication request, the confirmation received from one of the second wireless device and a third wireless device, and at least one response of the two or more responses to the timing request includes a denial of transmitting the de-authentication request, the denial received (i) from the second wireless device if the confirmation is received from the third wireless device or (ii) from the third wireless device if the confirmation is received from the second wireless device.

9. The method of claim 8, further comprising:
   storing at least a prior distance between the first wireless device and the second wireless device, and
   determining that one of the two or more responses which is associated with the de-authentication request is invalid based on a comparison of the prior distance with a distance associated with that one of the two or more responses and the confirmation of transmitting the de-authentication request in the one of the two or more responses.

10. The method of claim 9, further comprising:
    determining that the distance does not match the prior distance, wherein, in response to identifying that the de-authentication request is invalid based on the distance not matching the prior distance, providing an indication to ignore the de-authentication request.

11. The method of claim 8, further comprising:
    determining, prior to receiving the de-authentication request, a distance between the first wireless device and the second wireless device using timing measurements exchanged with the second wireless device; and
    storing the distance in a memory to maintain a log of previous distances between the first wireless device and the second wireless device.

12. The method of claim 8, wherein the timing request indicates the query based on at least one of a reserved bit and an additional bit, wherein the timing request is a fine time measurement (FTM) initiation request that includes at least one bit that causes the second wireless device to provide the response with the confirmation or denial of the de-authentication request.

13. The method of claim 8, wherein the first wireless device is an access point (AP) station and the second wireless device is a station communicating in a wireless local area network (WLAN) provided by the first wireless device, and
wherein receiving the at least two responses to the timing request includes monitoring for the responses for a threshold period of time.

14. The method of claim 8, wherein the second wireless device is an access point (AP) station and the first wireless device is a station communicating in a wireless local area network (WLAN) provided by the second wireless device, wherein a distance between the first wireless device and the second wireless device is based on a time measurement, the time measurement being a fine time measurement (FTM) that is an exchange of communications for a wireless location service (WLS).

15. An apparatus for validating a de-authentication request, the apparatus comprising:
a wireless controller module stored on a non-transitory computer-readable medium and including instructions that when executed cause the apparatus to receive the de-authentication request and determine whether the de-authentication request is invalid based on the wireless controller module's receipt of two or more responses to a timing request sent by the wireless controller module in response to the de-authentication request, wherein only one response is expected, and wherein the two or more responses include an address of a first station, and at least one response of the two or more responses to the timing request includes a confirmation of transmitting the de-authentication request, the confirmation received from one of the first station and a second station, and at least one response of the two or more responses to the timing request includes a denial of transmitting the de-authentication request, the denial received (i) from the first station if the confirmation is received from second station or (ii) from the second station if the confirmation is received from the first station.

16. The apparatus of claim 15, further comprising a memory configured to store at least a prior distance between the apparatus and the first station, and
wherein the wireless controller module is further configured with instructions to determine that one of the two or more responses which is associated with the de-authentication request is invalid based on a comparison of the prior distance with a distance associated with that one of the two or more responses and the confirmation of transmitting the de-authentication request in the one of the two or more responses.

17. The apparatus of claim 16, wherein the wireless controller module is configured to determine that the distance does not match the prior distance, wherein, in response to identifying that the de-authentication request is invalid based on the distance not matching the prior distance, the wireless controller module is configured to provide an indication to ignore the de-authentication request.

18. The apparatus of claim 15, wherein the wireless controller module is configured to:
determine, prior to receiving the de-authentication request, a distance between the apparatus and the first station using timing measurements exchanged with the first station, and
store the distance in a memory to maintain a log of previous distances between the apparatus and the first station.

19. The apparatus of claim 15, wherein the wireless controller is configured to indicate the query in the timing request based on at least one of a reserved bit and an additional bit, and wherein the timing request is a fine time measurement (FTM) initiation request that includes at least one bit that causes the first station to provide the response with the confirmation or denial of transmitting the de-authentication request.

20. The apparatus of claim 15, wherein the apparatus is an access point (AP) station and the first station is a station communicating in a wireless local area network (WLAN) provided by the apparatus, and
wherein the wireless controller module further includes instructions to: receive the at least two responses to the timing request by monitoring for the responses for a threshold amount of time.

* * * * *